United States Patent [19]

Gamble et al.

[11] Patent Number: 5,131,969
[45] Date of Patent: Jul. 21, 1992

[54] METHOD OF MAKING A THIN FILM OPTICAL QUALITY ASPHERIC SURFACE GENERATION USING X-RAYS

[75] Inventors: William L. Gamble, Huntsville; Jere S. Singleton, Madison, both of Ala.

[73] Assignee: The United States of America as represented by the Secretary of the Army, Washington, D.C.

[21] Appl. No.: 576,757

[22] Filed: Aug. 27, 1990

[51] Int. Cl.⁵ .............................................. B32B 31/28
[52] U.S. Cl. ........................... 156/196; 29/421.1; 156/272.2; 264/1.4; 264/22; 264/553; 359/847
[58] Field of Search .................... 264/22, 553, 1.4; 156/272.2, 196; 359/847; 29/447, 448, 421.1, DIG. 35, DIG. 44

[56] References Cited

U.S. PATENT DOCUMENTS

| | | |
|---|---|---|
| 3,872,194 | 3/1976 | Lowry et al. .................. 264/22 |
| 4,046,462 | 9/1977 | Fletcher et al. ............... 359/847 |
| 4,740,335 | 4/1988 | Scholz et al. ................. 264/22 |
| 4,968,460 | 11/1990 | Thompson et al. ............ 264/22 |

*Primary Examiner*—Michael W. Ball
*Assistant Examiner*—Michele K. Yoder
*Attorney, Agent, or Firm*—Freddie M. Bush; James T. Deaton

[57] ABSTRACT

A method is disclosed for providing an optical quality aspheric surface from a thin film metalized elastic membrane by treating the membrane with x-rays to cause the elasticity of the membrane to be increased in predetermined area so that when the membrane is subjected to a differential pressure across faces thereof the membrane will assume the desired aspheric surface.

8 Claims, 1 Drawing Sheet

METHOD OF MAKING A THIN FILM OPTICAL QUALITY ASPHERIC SURFACE GENERATION USING X-RAYS

DEDICATORY CLAUSE

The invention described herein may be manufactured, used, and licensed by or for the Government for governmental purposes without the payment to us of any royalties thereon.

BACKGROUND OF THE INVENTION

In the past, methods of preparing very high quality thin film of a variety of materials have been used. One of the best ways is called spin casting. It is well known that applying a differential pressure on a membrane bonded to a flat circular ring will generate an axially symmetric surface of high quality. Current reflective metal coating technologies allow a membrane stretch of 5% or more before the elastic limit of the coating is exceeded. Elastic membranes will generally stretch more than 5% before the elastic limit of the membrane material is exceeded. NASA as well as other organizations are now pursuing rather elaborate zonal corrections using electrostatic forces due to charge rings located immediately behind the film in order to improve the optical figure. Such an approach requires a continuous monitoring of the surface figure so that feed-back signals can be generated to charge the rings properly. With the methods that are being used, it can be readily appreciated that a much simpler method of accomplishing the same results is needed.

SUMMARY OF THE INVENTION

Accordingly, it is an object of this invention to provide a method that simplifies the method for making zonal corrections of thin films to improve the optical figure.

Another object of this invention is to provide a method in which local changes in the modulus of elasticity of a thin film are achieved by using a modest x-ray dosage.

Still another object of this invention is to provide a method which is capable of local modification of the curvature of a membrane by 5% when the membrane is stretched by a pressure differential to form an optical mirror with optical power.

Other objects and advantages of this invention will be obvious to those skilled in this art.

In accordance with this invention, a method is provided for forming an aspheric surface. The method includes placing a metalized elastic membrane on a flat surface and bonding a ring that has a flat surface to said metalized elastic membrane. The metalized elastic membrane is then heated to make the membrane taut. With the elastic membrane taut relative to the flat ring, a ring shaped portion of the metalized elastic membrane is subjected to x-rays to cause the modulus of elasticity of the elastic membrane to increase and, therefore, stiffen in the area exposed to the x-rays. After the appropriate amount of x-rays has been applied, a vacuum is applied to one side of the membrane to cause the membrane to take an aspheric shape such as parabolic. When subjected to distorting forces, such as a vacuum, the ring portion (that was subjected to the x-rays) stretches less than the untreated portion and, therefore, assumes the aspheric shape. The ring portion, that is subjected to the x-rays, stretches less than the untreated portion, and therefore, the parabolic or other desirable shape is made possible.

THE DESCRIPTION OF THE DRAWING

DESCRIPTION OF THE PREFERRED EMBODIMENT

The method of this invention involves the local modification of the modulus of elasticity of a membrane in a controlled way. The elastic membrane can have a uniform thickness or a non-uniform thickness depending upon the particular application. That is, the elastic membrane can have a thickness that will produce a surface close to what is desired and can then be exposed to x-rays for accomplishing the remaining desired modification of the membrane. The method of this invention is capable of achieving almost any aspheric surface in an iterative method of optical test and modification. The local change in the modulus of elasticity is achieved by using a modest x-ray dosage. This approach has been demonstrated to be capable of local modification of the curvature of a membrane by 5% when the membrane is stretched, by a pressure differential, to form an f/2 reflective optical surface.

Figure 1:
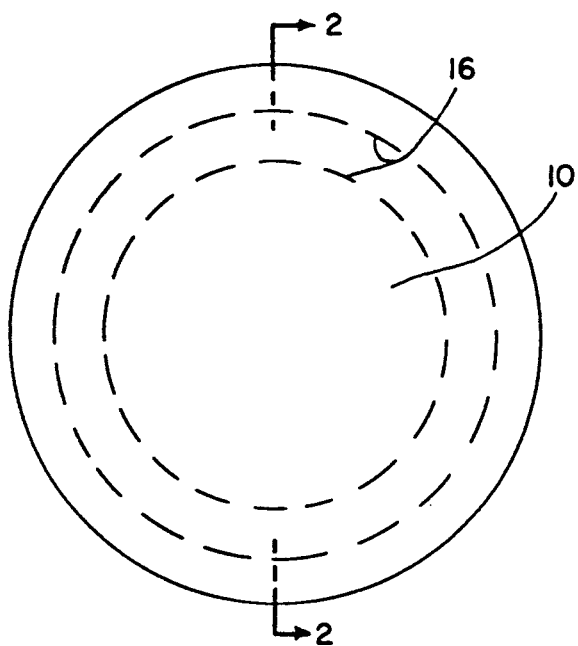
FIG. 1 is a top view of an elastic membrane mounted on a ring structure.
Figure 2:
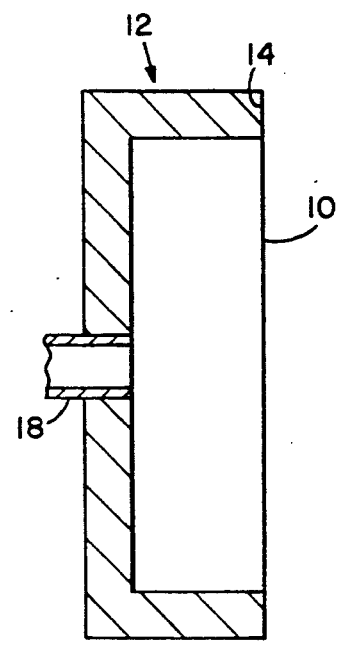
FIG. 2 is a sectional view along line 2—2 of FIG. 1.

Referring now to the drawing, the method, in accordance with this invention, is carried out by placing a metalized elastic membrane, such as an aluminized mylar of a thickness of about 4 milli-inches, on a flat surface. A housing 12 with a flat ring end 14 is placed over an elastomeric sheet 10 and sheet 10 is then bonded to ring end 14 in a conventional manner to provide a leak tight connection. This can be accomplished with a conventional epoxy material for bonding sheet 10 to end member 14. With sheet 10 bonded to end member 14, hot air such as from a heat gun is applied to sheet 10 to cause the sheet to shrink to become taut. With sheet 10 taut, a predetermined area such as illustrated between dash lines 16 of FIG. 1 is exposed to x-rays to cause the modulus of elasticity of sheet 10 in this area to be increased and for this treated zonal portion 16 of sheet 10 to be made stiffer.

Zonal area 16 can be treated with x-rays that are presented in the shape of zonal area 16 or by a source that is exposed to the ring shaped zonal path of shape 16. That is, an x-ray source can be rotated relative to sheet 10 about zonal area 16 or housing 12 can be rotated relative to a fixed x-ray source so as to expose zonal area 16 in a way to equally expose each segment of zonal area 16. It has been found that by exposing a portion of zonal area 16 to a fifty kilovolt/20 milliampere-x-ray tube for two hours causes a 5% flattening of the membrane in the exposed area and is sufficient for achieving some interesting optical figures.

Figure 3:
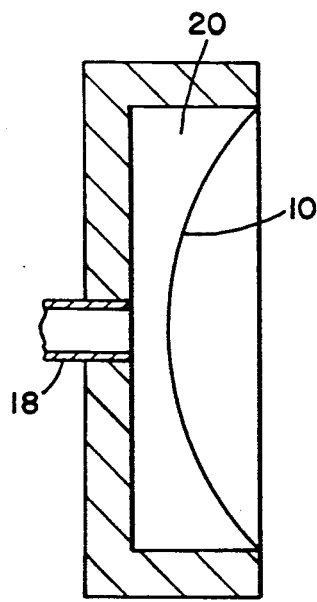
FIG. 3 is a sectional view of an elastic membrane mounted on a ring structure with a vacuum pulled on one side of the membrane.
Figure 4:
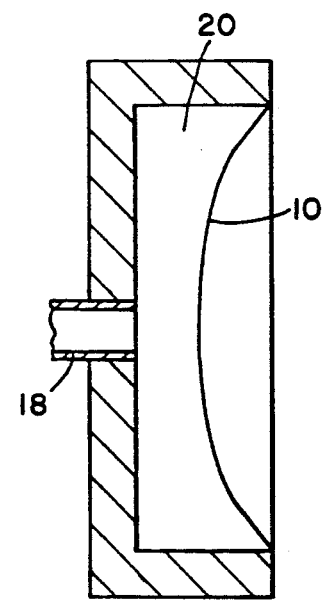
FIG. 4, is a sectional view illustrating an elastic membrane, mounted on a ring structure in which the elastic membrane has been subjected to x-rays to cause the membrane to assume a parabolic shape when subjected to vacuum on one side thereof, is illustrated.

Greater flattening can be accomplished if desired. The membrane can be flattened, more or less, by increasing or decreasing the x-ray dosage in the area that is to be treated. By treating membrane sheet 10 with an x-ray dosage as set forth, the desired aspheric shape of membrane sheet 10 can be controlled to have a parabolic, hyperbolic or other aspheric shape, that is desired. This shape is realized by placing a vacuum on line 18 to pull a vacuum in chamber 20, which causes membrane 10 to have an aspheric shape such as illustrated in FIG. 4, which is the desired shape. If membrane 10 is not treated with an x-ray dosage, and is subjected to a vacuum such as at line 18 of FIG. 3 by a vacuum in chamber 20, the membrane will have a uniform spherical shape such as illustrated in FIG. 3. As will be appreciated, by subjecting zonal area 16 of elastic membrane 10 to an appropriate x-ray dosage, the shape of the membrane can be flattened to any desirable shape for producing an optical mirror and this process or method is an iterative method in that the membrane can be treated more or less to produce the desired flatness in the area desired to be flattened. This method can be applied to any elastic membrane that becomes stiffer and has the modulus of elasticity increased when subjected to x-ray.

To the extent that a metalized elastic membrane material in a mirror remains a homogenous Hook's law material (a material in which the percentage elongation or stretch is proportional to the applied tensile force) a parabolic, hyperbolic or other aspheric surface should maintain its basic shape over a substantial change in focal length by means of changing the applied pressure. This will allow continuous zoom capabilities for seekers and sensors in missiles. Since such sensors can be all reflective, multiple spectral band focal planes are possible to the extent that suitable domes and windows can be produced. Multispectral sensors will greatly remove many logistical problems in separate day and night missiles as well as reducing enormously the complexity of boresight maintenance equipment for launch units.

We claim:

1. A method of making an optical quality aspheric surface, comprising the following steps:
   (a) bonding a metalized elastic membrane to a rigid flat ring;
   (b) heating said membrane until it is taut within said ring;
   (c) subjecting a predetermined peripheral zonal area of said membrane to an x-ray dosage to increase its modulus of elasticity in said predetermined zonal area to a predetermined degree; and
   (d) subjecting opposite faces of said taut membrane to different fluid pressures to shape said membrane into a predetermined aspheric surface of an optical quality.

2. A method as set forth in claim 1 wherein said membrane is subjected to said x-ray dosage by causing a source of x-rays and said rigid ring to move relative to each other to subject said zonal area to a predetermined dosage of said x-rays.

3. A method as set forth in claim 2, including the step of maintaining said rigid ring stationary while moving said x-ray source about said peripheral zonal area of said membrane.

4. A method as set forth in claim 2, wherein said x-ray source is maintained in a stationary position and said rigid ring is moved past said x-ray source to selectively x-ray said predetermined peripheral zonal area of said membrane.

5. A method of making an optical quality aspheric surface, comprising the following steps:
   (a) bonding a metalized elastic membrane to a rigid flat ring;
   (b) heating said membrane until it is taut within said rigid ring;
   (c) subjecting a predetermined peripheral zonal area of said membrane to an x-ray dosage adapted to increase the modulus of elasticity of said membrane in said predetermined peripheral zonal area to modify its curvature when said membrane is stretched; and
   (d) subjecting opposite faces of said taut membrane to different fluid pressures to stretch and shape said membrane into a predetermined aspheric surface of an optical quality wherein the curvature of said membrane is determined by the predetermined modulus of elasticity of said membrane in said peripheral zonal area.

6. A method as set forth in claim 5 wherein said membrane is subjected to said x-ray dosage by causing a source of x-rays and said rigid ring to move relative to each other to subject said zonal area to a predetermined dosage of said x-rays.

7. A method as set forth in claim 6, including the step of maintaining said rigid ring stationary while moving said x-ray source about said peripheral zonal area of said membrane.

8. A method as set forth in claim 6, wherein said x-ray source is maintained in a stationary position and said rigid ring is moved past said x-ray source to selectively x-ray said predetermined peripheral zonal area of said membrane.

* * * * *